US 7,669,053 B2

(12) United States Patent
Gantman

(10) Patent No.: US 7,669,053 B2
(45) Date of Patent: Feb. 23, 2010

(54) SYSTEM AND METHOD FOR USING ACOUSTIC DIGITAL SIGNATURE GENERATOR AS ORACLE

(75) Inventor: Alexander Gantman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 11/349,328

(22) Filed: Feb. 6, 2006

(65) Prior Publication Data
US 2007/0180243 A1  Aug. 2, 2007

Related U.S. Application Data

(63) Continuation of application No. 10/171,960, filed on Jun. 13, 2002, now abandoned.

(51) Int. Cl.
H04L 29/06 (2006.01)
G06F 21/00 (2006.01)
G06F 11/30 (2006.01)
G06F 7/04 (2006.01)
G06K 19/06 (2006.01)
H04L 9/00 (2006.01)
H04L 9/32 (2006.01)
A63F 5/04 (2006.01)
A63F 13/00 (2006.01)

(52) U.S. Cl. .................. 713/168; 713/184; 713/186; 726/9; 726/18; 726/20; 235/492

(58) Field of Classification Search ............... 713/168, 713/176, 186; 726/5, 9; 380/202
See application file for complete search history.

(56) References Cited

U.S. PATENT DOCUMENTS 5,432,851 A * 7/1995 Scheidt et al. ............... 713/184
6,035,406 A * 3/2000 Moussa et al. ............... 726/18
6,607,136 B1 * 8/2003 Atsmon et al. .............. 235/492
6,804,786 B1 * 10/2004 Chamley et al. ............. 726/20

FOREIGN PATENT DOCUMENTS

WO    WO 2007116368 A1 * 10/2007

OTHER PUBLICATIONS

Judith A. Markowitz, "Voice biometrics", Sep. 2000, Communications of the ACM, vol. 43 Issue 9, Publisher: ACM, pp. 66-73.*

* cited by examiner

Primary Examiner—Matthew B Smithers
Assistant Examiner—Courtney D Fields
(74) Attorney, Agent, or Firm—Turocy & Watson, LLP

(57) ABSTRACT

A hand-held sonic token can be used as a pseudorandom oracle for a requesting application, which can generate a challenge that is sent to the token. The user of the token decides whether to allow the token to function as an oracle, and if so, the user causes the token to digitally sign the challenge and send it back to the requesting application, for use of the digitally signed challenge as an encryption key. After encryption the requesting application deletes the signed challenge, with subsequent decryption essentially following the encryption process.

29 Claims, 2 Drawing Sheets

SYSTEM AND METHOD FOR USING ACOUSTIC DIGITAL SIGNATURE GENERATOR AS ORACLE

CLAIM OF PRIORITY UNDER 35 U.S.C. §120

The present Application for Patent is a continuation of patent application Ser. No. 10/171,960 entitled "SYSTEM AND METHOD FOR USING ACOUSTIC DIGITAL SIGNATURE GENERATOR AS ORACLE" filed Jun. 13, 2002, now abandoned, and assigned to the assignee hereof and hereby expressly incorporated by reference herein.

FIELD OF THE INVENTION

The present invention relates generally to pseudorandom oracles.

BACKGROUND OF THE INVENTION

The above-identified patent applications disclose hand-held sonic-based "tokens" that a person can manipulate to transmit an acoustic signal representing secret information to a device, referred to as an "authenticator", "verifier", or "receiver", to authenticate the person based on the signal. As recognized in those applications, the advantage of sonic-based tokens is that a large installed infrastructure already exists to receive and transmit sound and electronic signals derived from sound. Specifically, the global telephone system exists to transmit data representative of acoustic information, and apart from telephones many computing devices that are now linked by this same system (as embodied in the Internet) have microphones and speakers (or can easily be modified to have them).

As recognized herein, sonic tokens have the advantage of transmitting the private information on the token in a fashion that prevents the receiver from knowing the private information without a confidential key. Specifically, the above-referenced applications disclose sonic tokens that digitally sign a message using private key/public principles. More specifically, the sonic tokens digitally sign a message by combining the message with secret information (a private key) and with a pseudorandom number (PN) to render a signed message that can be verified as authentic only by an entity possessing the public key that corresponds to the private key.

As further recognized herein, the above-discussed properties of sonic tokens render them suitable for use as pseudorandom oracles for encryption purposes. More particularly, the present invention recognizes that if an application requires a relatively strong encryption key, it selectively can be granted access to the token by a user of the token to obtain, for use as an encryption key, the product of the secret information in the token, but not the secret information itself, thereby keeping it secure.

SUMMARY OF THE INVENTION

A method is disclosed for essentially converting an easy to remember challenge to a pseudorandom encryption key using a hand-held sonic token as a pseudorandom oracle. The pseudorandom encryption key that is generated by the sonic token is a relatively strong key that is difficult for unauthorized parties to violate.

Accordingly, a method for encryption includes generating a challenge, and acoustically sending the challenge to a portable token. The method further includes deciding whether to allow the token to function as a pseudorandom oracle, and if so, causing the token to digitally sign the challenge to render a signed challenge. The signed challenge is acoustically transmitted for use thereof to encrypt data.

In a preferred, non-limiting embodiment, the challenge is generated by a requesting application which encrypts data using the signed challenge. If desired, the challenge may be displayed in human readable form to help a user decide whether to allow the token to be used as a pseudorandom oracle.

In exemplary non-limiting embodiments, the token digitally signs the challenge at least in part by combining the challenge with a private key. The private key can be a secret and can have a corresponding public key.

If desired, the signed challenge can be generated using a process that always renders the same signed challenge when presented with the same challenge. For instance, the token can digitally sign the challenge by combining the challenge with the private key and with a pseudorandom number (PN), and when a challenge is signed, the PN can be stored for reuse upon a second receipt of the same challenge for, e.g., decryption purposes.

In another aspect, a system for encryption includes a requesting application transmitting a challenge to a token using a wireless communication path. A token receives the challenge and digitally signs it with a private key to render a signed challenge. The token then transmits the signed challenge to the requesting application using a wireless communication path, so that the requesting application can use the signed challenge to encrypt data.

In yet another aspect, an encryption system includes acoustic means for transmitting a challenge from a requesting application, and means for receiving the challenge and generating a signed challenge in response. Acoustic means are provided for transmitting the signed challenge to the requesting application. Means are also provided for encrypting data associated with the requesting application using the signed challenge.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
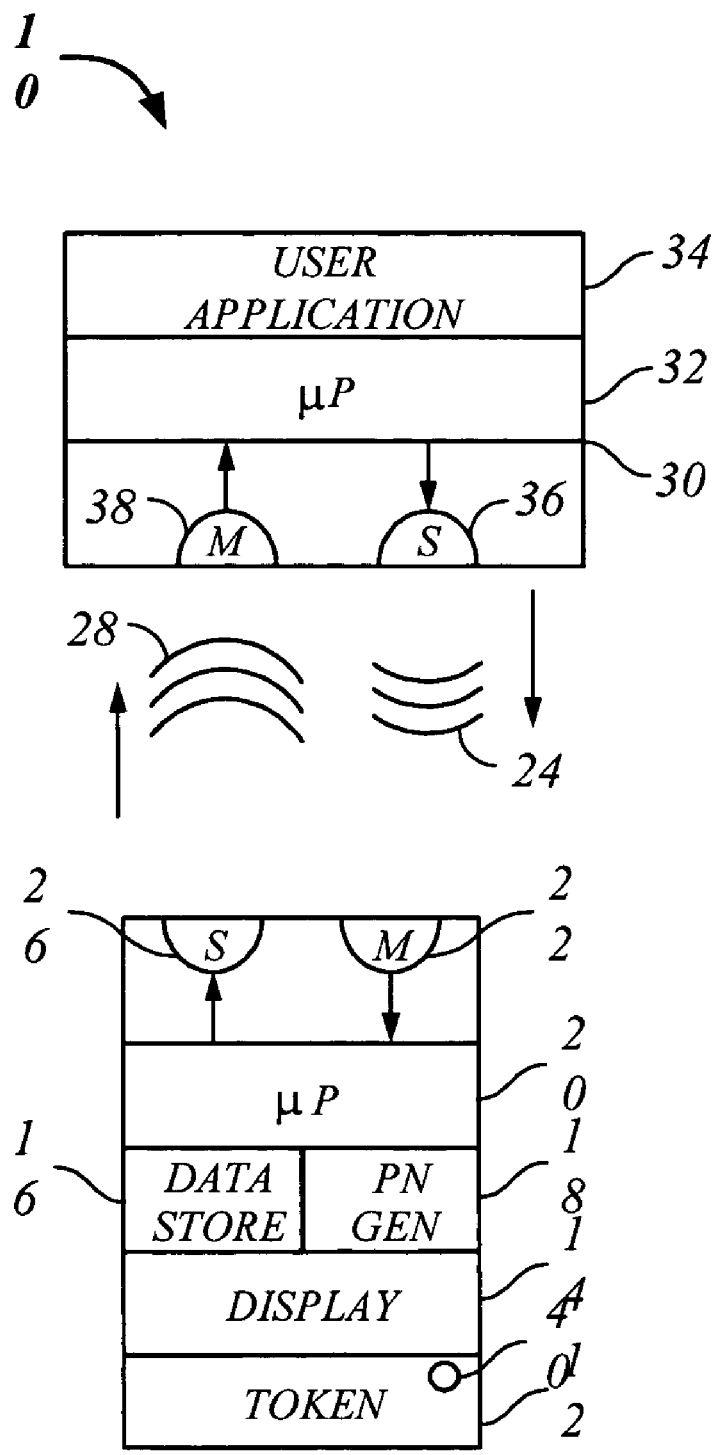
FIG. 1 is a block diagram of the present system.

Referring initially to FIG. 1, a system is shown, generally designated 10, that includes a portable hand-held token 12 that can be configured as a key fob or other small device. The present invention, however, applies to other token configurations, such as mobile communication stations including laptop computers, wireless handsets or telephones, data transceivers, or paging and position determination receivers that can be hand-held or portable as in vehicle-mounted (including cars, trucks, boats, planes, trains), as desired. Wireless communication devices are also sometimes referred to as user terminals, mobile stations, mobile units, subscriber units, mobile radios or radiotelephones, wireless units, or simply as "users" and "mobiles" in some communication systems.

In any case, the preferred token 12 includes a visual display 14 and an electronic data store 16. Also, the token 12 can include a pseudorandom number (PN) generator 18. A token microprocessor 20 accesses the PN generator 18 and data store 16, and can cause the display 14 to present alphanumeric or graphical information that a user can read or hear.

As shown in FIG. 1, the token microprocessor 20 can receive electronic signals from a microphone 22, which generates the electronic signals by transforming received sound waves 24 received by the microphone 22. Also, the token microprocessor 20 can send electronic signals to a speaker 26, which transforms the electronic signals to transmitted sound signals 28. As disclosed further below, the received sound signals 24 might represent a challenge (e.g., a request for encryption key) from a user component 30, and the transmitted sound signals 28 might represent a signed challenge (e.g., the requested encryption key). While an acoustic wireless communication is preferred, other wireless paths, e.g., rf paths, might be used.

The user component 30 can be, e.g., a computer that includes a requesting microprocessor 32 which executes a software-implemented user application 34. The user application 34 can be, e.g., a word processing application or other document-generating or more generally data-generating application that might wish to encrypt the generated data with a relatively strong encryption key. In any case, the user component 30 can include a speaker 36 for transmitting an acoustic representation of a challenge and a microphone 38 for receiving an acoustic representation of the response. Both the speaker 36 and microphone 38 communicate with the requesting microprocessor 32.

In accordance with private key/public key principles known in the art and set forth in, e.g., the National Institute for Standards and Technology (NIST) Federal Information Processing Standards Publication 186-2, January, 2000, the signature algorithm in the token 12 (executed by the token microprocessor 20) can combine a private key with a message to be signed and with a random number "k" from the PN generator 18 to render a digital signature which is a random pair (r,s). Preferably, the token microprocessor 20 executes the signature algorithm upon receipt of activation signals from, e.g., one or more activation elements 40 such as toggle switches, voice activation devices, or pushbuttons. It is to be understood that the token microprocessor 20 can include a digital processor proper as well as necessary clocks, analog to digital conversion circuitry, and digital to analog conversion circuitry known in the art.

The token microprocessor 20 accesses the data store 16, such that when multiple activation elements 40 are used, one or more can be associated with a respective private key in the store 16. In addition to one or more private keys of private key/public key pairs, the data store 16 may hold public key IDs, and if desired PNs that have already been generated and used to sign challenges, along with a correlation of the PNs to the challenges, in accordance with one non-limiting exemplary embodiment disclosed below.

Figure 2:
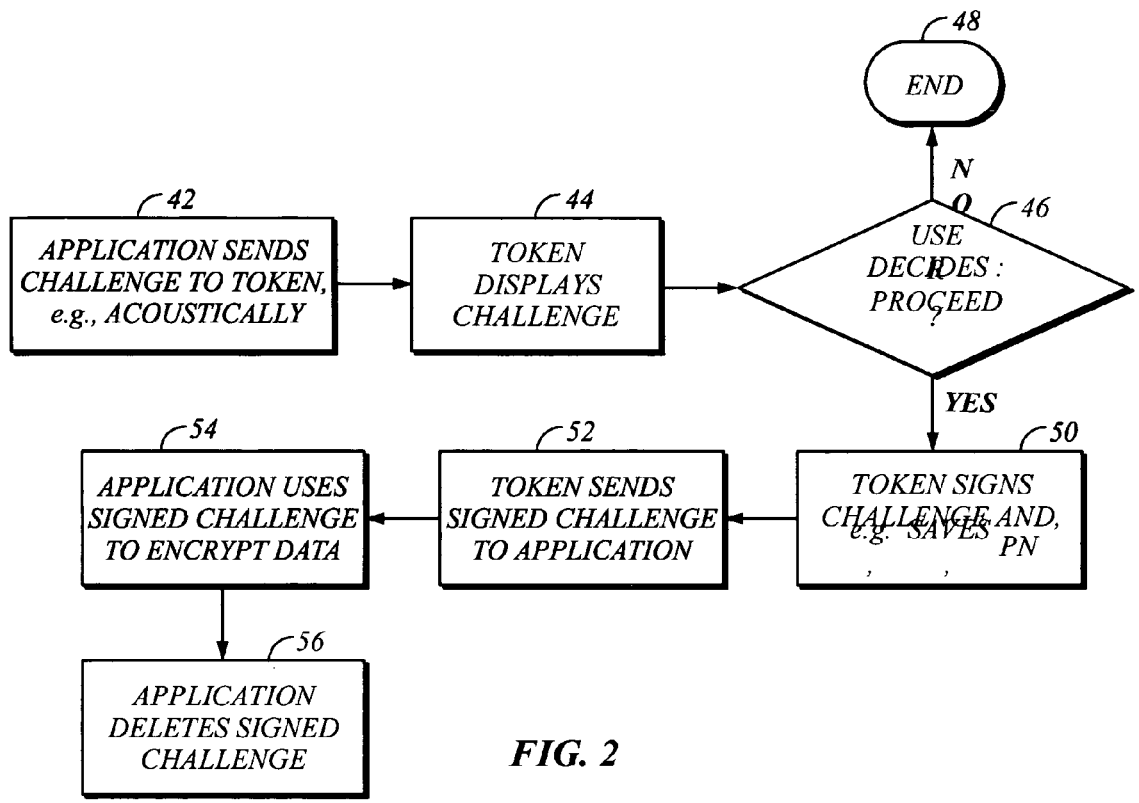
FIG. 2 is a flow chart of the encryption logic.

FIG. 2 shows the encryption logic of the present invention. Commencing at block 42, a challenge (e.g., an easy to remember challenge such as the word "password") is generated by, e.g., the user application 34 and is sent by the user component 30 to the token 12 using the communication pathway discussed above in reference to FIG. 1. If desired, at block 44 the token 12 can display the challenge and, if desired, the source of the challenge in human readable form on the display 14, so that a user may decide, at decision diamond 46, whether to allow the token 12 to function as a pseudorandom oracle. If the user decides against allowing the application 34 to access the token 12 for oracle purposes, the logic ends at state 48.

On the other hand, if the user decides to allow the token 12 to function as an oracle, the user can so indicate by, e.g., manipulating the activation element 40. The logic then proceeds from decision diamond 46 to block 50, wherein the token digitally signs the challenge to render a signed challenge. In some preferred, non-limiting embodiments, the token uses a signing process that always renders the same signed challenge when presented with the same challenge. For instance, the token 12 might combine the challenge with a private key in the data store 16 but not with a PN from the PN generator 18. Or, the conventional private key protocol might be followed, wherein the signed challenge is generated by combining the challenge with both the private key and with a PN, but with the PN subsequently being stored in the data store 16 along with a correlation of the PN to the particular challenge with which it was used, for purposes to be shortly disclosed.

Moving to block 52, the token 12 sends the signed challenge to the user component 30 using the communication paths disclosed above for use of the signed challenge as an encryption key by the user application 34 to encrypt data at block 54 using, e.g., DES encryption principles known in the art. Preferably, the application then proceeds to block 56 to delete the signed challenge from its memory and from any peripheral storage devices (e.g., hard disk drives) associated with the user component 30 on which the signed challenge might have been stored.

Figure 3:
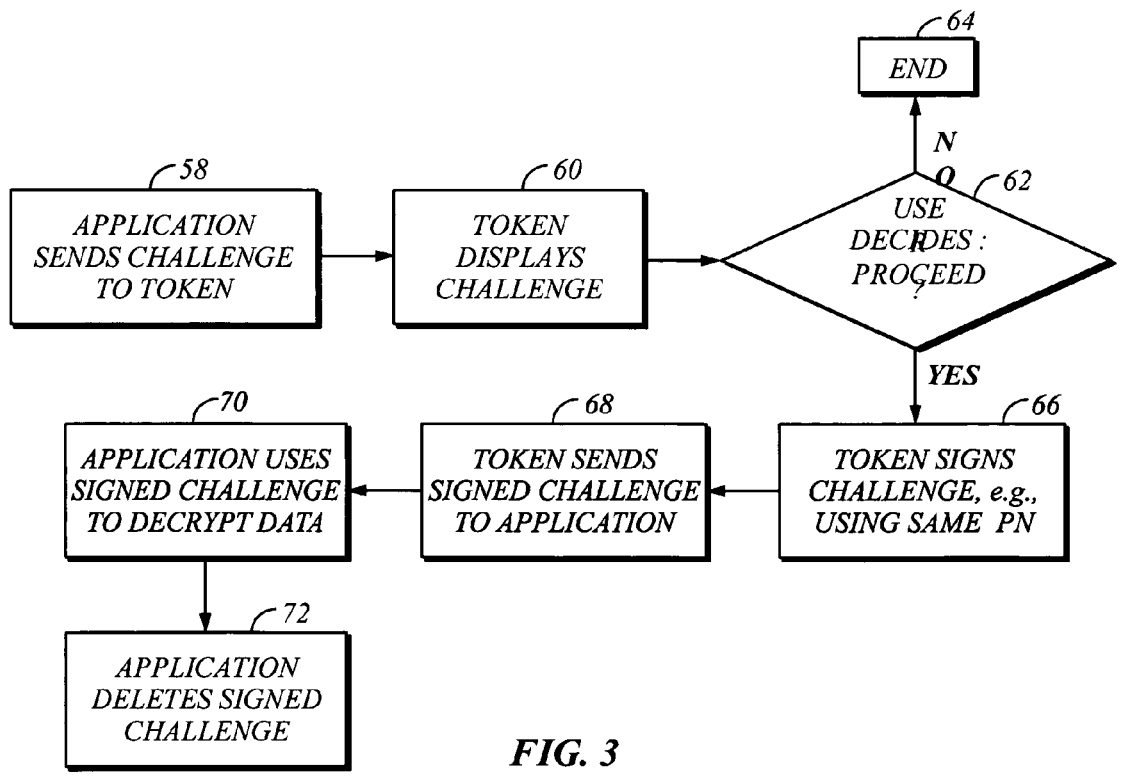
FIG. 3 is a flow chart of the decryption logic.

When it is desired to decrypt the data, the logic of FIG. 3 is invoked. Commencing at block 58, the same challenge that was used in FIG. 2 is sent by the user component 30 to the token 12. If desired, at block 60 the token 12 can display the challenge in human readable form on the display 14, so that a user may decide, at decision diamond 62, whether to allow the token 12 to function as a pseudorandom oracle for decryption purposes. If the user decides against this, the logic ends at state 64. Otherwise, the logic proceeds to block 66, wherein the token digitally signs the challenge to render a signed challenge. In the above-mentioned preferred, non-limiting embodiments wherein it is desired that the token always generates the same signed challenge when presented with the same input challenge, the token can, e.g., regenerate the same signed challenge as was generated for encryption using a signing process that does not require a PN, or it can regenerate the same signed challenge using conventional private key protocol, with the following exception. The PN that was used to generate the signed challenge during encryption and that was subsequently stored in the data store 16 (along with a correlation of the challenge) can be retrieved at block 66 based on the challenge and then combined with the challenge and the private key to render the signed challenge.

Moving to block 68, the token 12 sends the signed challenge to the user component 30 for use of the signed challenge by the user application 34 to decrypt data at block 70. Preferably, the application then proceeds to block 72 to delete the signed challenge from its memory and from any peripheral storage devices (e.g., hard disk drives) associated with the user component 30 on which the signed challenge might have been stored.

While the particular SYSTEM AND METHOD FOR USING ACOUSTIC DIGITAL SIGNATURE GENERATOR AS ORACLE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

The invention claimed is:

1. A method for use in a token, comprising:
   receiving sound signals representing a challenge from an application;
   displaying a source of the challenge on the token in human readable form;
   digitally signing the challenge to render a signed challenge; and
   transmitting the signed challenge to the application for use as an encryption key to encrypt data.

2. The method of claim 1, wherein digitally signing the challenge comprises:
   using a signing process that always renders the same signed challenge when presented with the same challenge.

3. The method of claim 1, wherein digitally signing the challenge comprises: combining the challenge with a private key.

4. The method of claim 1, wherein digitally signing the challenge comprises:
   generating a pseudorandom number (PN) in responses to receiving the sound signals representing the challenge;
   combining the challenge with a private key and with the PN; and
   subsequently storing the PN together with a correlation of the PN to the challenge.

5. The method of claim 4 further comprising:
   subsequently receiving sound signals representing the same challenge;
   retrieving the stored PN in accordance with the stored correlation; and
   rendering the same signed challenge using the retrieved PN in response to receiving the sound signals representing the same challenge.

6. The method of claim 1, wherein transmitting the signed challenge comprises transmitting sound signals representing the signed challenge.

7. A token, comprising:
   means for receiving sound signals representing a challenge from an application;
   means for displaying a source of the challenge in human readable form;
   means for digitally signing the challenge to render a signed challenge; and
   means for transmitting the signed challenge to the application to be used as an encryption key to encrypt data.

8. The token of claim 7, wherein the means for digitally signing the challenge uses a signing process that always renders the same signed challenge when presented with the same challenge.

9. The token of claim 7, wherein the means for digitally signing the challenge comprises:
   means for combining the challenge with a private key.

10. The token of claim 7, wherein the means for digitally signing the challenge comprises:
    means for generating a pseudorandom number (PN);
    means for combining the challenge with a private key and with the PN; and
    means for subsequently storing the PN together with a correlation of the PN to the challenge.

11. The token of claim 10, further comprising:
    means for employing the stored correlation to retrieve the stored PN in response to subsequently receiving sound signals representing the same challenge; and
    means for rendering the same signed challenge using the retrieved PN in response to receiving the sound signals representing the same challenge.

12. The token of claim 7, wherein the means for transmitting the signed challenge comprises:
    means for transmitting sound signals representing the signed challenge.

13. A token comprising:
    a microphone that receives sound signals representing a challenge from an application;
    a microprocessor that receives the challenge from the microphone and digitally signs the challenge to render a signed challenge;
    a display that displays a source of the challenge in human readable form; and
    a speaker that transmits sound signals representing the signed challenge to the application for use as an encryption key to encrypt data.

14. The token of claim 13, further comprising:
    a data store configured to store a private key, wherein the microprocessor digitally signs the challenge by combining the challenge with the private key.

15. The token of claim 13, further comprising:
    a data store configured to store a private key; and
    a pseudorandom number (PN) generator configured to generate a PN in response to the received challenge;
    wherein the microprocessor digitally signs the challenge by combining the challenge with the private key and with the PN; and
    wherein the data store stores the PN together with a correlation of the PN to the challenge, the token uses the stored PN and correlation to render the same signed challenge when the token subsequently receives the same challenge that facilitated generation of the stored PN.

16. The token of claim 13, further comprising:
    a speaker configured to transmit sound signals representing the signed challenge.

17. A system for use in a token, comprising:
    a processor, the processor configured to control:
    receiving sound signals representing a challenge from an application;
    displaying a source of the challenge in human readable form;
    digitally signing the challenge to render a signed challenge; and
    transmitting the signed challenge to the application to be employed as an encryption key to encrypt data.

18. The system of claim 17, wherein transmitting the signed challenge comprises:
  transmitting sound signals representing the signed challenge.

19. A method for use in a user component comprising:
  generating a challenge, wherein the challenge includes a source of the challenge in human readable form;
  transmitting the challenge and the source of the challenge in human readable form;
  receiving an acoustic representation of a signed challenge;
  using the signed challenge as an encryption key to encrypt data; and
  deleting the signed challenge after encrypting the data.

20. The method of claim 19, wherein transmitting the challenge comprises: transmitting acoustic representation of the challenge.

21. The method of claim 19, further comprising: using the signed challenge to decrypt data.

22. The method of claim 21, further comprising: deleting the signed challenge.

23. A user component comprising:
  means for generating a challenge, wherein the challenge includes a source of the challenge in human readable form;
  means for transmitting the challenge and the source of the challenge in human readable form;
  means for receiving a signed challenge, the means for receiving comprising a microphone configured to receive an acoustic representation of the signed challenge;
  means for using the signed challenge to decrypt data; and
  means for deleting the signed challenge after decrypting the data.

24. The user component of claim 23, wherein means for transmitting the challenge comprises:
  a speaker configured to transmit acoustic representation of the challenge.

25. The user component of claim 23, further comprising: means for using the signed challenge as an encryption key to encrypt data.

26. The user component of claim 25, further comprising: means for deleting the signed challenge.

27. A system for use in a user component, comprising:
  a processor, the processor configured to control:
    generating a challenge, wherein the challenge includes a source of the challenge in human readable form;
    transmitting the challenge by transmitting an acoustic representation of the challenge in human readable form;
    receiving an acoustic representation of a signed challenge;
    using the signed challenge as an encryption key to encrypt data; and
    deleting the signed challenge.

28. The system of claim 27, wherein the processor is further configured to control:
  using the signed challenge to decrypt data.

29. The system of claim 28, wherein the processor is further configured to control:
  deleting the signed challenge.

* * * * *